(12) United States Patent  
Hubner et al.

(10) Patent No.: US 8,666,109 B2  
(45) Date of Patent: Mar. 4, 2014

(54) SYSTEM AND METHODS FOR RECORDING EMERGENCY DATA

(75) Inventors: Paul V. Hubner, McKinney, TX (US);  
Kristopher A. Pate, Sachse, TX (US);  
Steven T. Archer, Dallas, TX (US);  
Robert A. Clavenna, Lucas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 994 days.

(21) Appl. No.: 12/208,946

(22) Filed: Sep. 11, 2008

(65) Prior Publication Data

US 2010/0061662 A1    Mar. 11, 2010

(51) Int. Cl.  
*G06K 9/00* (2006.01)  
*G06K 9/60* (2006.01)  
*H04M 11/00* (2006.01)  
*H04M 11/06* (2006.01)

(52) U.S. Cl.  
USPC ........... 382/100; 382/305; 382/313; 455/403; 455/404.1

(58) Field of Classification Search  
USPC ................ 382/100, 305, 313; 455/403, 404.1  
See application file for complete search history.

(56) References Cited

U.S. PATENT DOCUMENTS

| | | | |
|---|---|---|---|
| 6,748,223 B2 * | 6/2004 | Fraccaroli | 455/456.1 |
| 7,433,672 B2 * | 10/2008 | Wood | 455/404.1 |
| 7,840,203 B2 * | 11/2010 | Shin | 455/404.1 |
| 8,045,954 B2 * | 10/2011 | Barbeau et al. | 455/404.1 |
| 2002/0137528 A1 * | 9/2002 | Fraccaroli | 455/457 |
| 2005/0094188 A1 * | 5/2005 | Suzuki et al. | 358/1.15 |
| 2005/0215229 A1 * | 9/2005 | Cheng | 455/404.1 |
| 2005/0287980 A1 * | 12/2005 | Wood | 455/404.1 |
| 2006/0044407 A1 * | 3/2006 | Barbeau | 348/211.3 |
| 2006/0092043 A1 * | 5/2006 | Lagassey | 340/907 |
| 2007/0042747 A1 * | 2/2007 | Sun | 455/403 |
| 2007/0123224 A1 * | 5/2007 | Nishiyama et al. | 455/414.1 |
| 2010/0048159 A1 * | 2/2010 | Stenquist | 455/404.1 |

* cited by examiner

*Primary Examiner* — Michael A Newman

(57) ABSTRACT

A system and method for recording emergency data during a 911 call. The emergency data recorded may be in the form of a digital image. The digital image may be of the event prompting the 911 call. The digital image may be a single image, a series of images, or streaming video. The emergency data may be received on a portable electronic device, such as a cell phone, through a digital imaging device, such as a digital camera. The emergency data may then be transmitted to a server, wherein the emergency data is stored. The emergency data may be accessed by a 911 dispatcher during a 911 call to review the image data to aid in assessing the emergency recorded in the emergency data.

27 Claims, 3 Drawing Sheets

SYSTEM AND METHODS FOR RECORDING EMERGENCY DATA

BACKGROUND INFORMATION

Many people own a portable electronic device. Portable electronic devices have increasing capability beyond voice communications. These portable electronic devices include mobile phones (e.g., cell or cellular phones) and personal digital assistants (PDAs). Many portable electronic devices have imaging capability built in, such as a digital camera. Such digital cameras may have high resolution, enabling the user of the portable electronic device to take clear digital images. Many digital cameras also have digital video capability; that is the digital camera is capable of taking streaming video. Such digital images can be taken by the portable electronic device. The images can typically be saved on the portable electronic device. The images may also be transmitted from the portable electronic device to another portable electronic device.

In an emergency, a person may dial 911. The person may have a portable electronic device, such as a cell phone, with them. They may dial 911 on the portable electronic device, since it may provide the fastest and most convenient means to call for help. 911 is the primary emergency number in most areas of the United States. Upon connection of the 911 call, the person may be connected to a dispatcher, through a voice connection. The dispatcher is typically a trained individual who will ask the caller questions to determine the nature of the emergency. The dispatcher, upon assessing the situation, is then able to dispatch law enforcement, fire, or emergency medical personnel to the scene to provide aid to the caller or others that may require assistance. A combination of emergency personnel may be dispatched, such as fire and emergency medical personnel.

It is understood that 911 may be a typical emergency number. However, other such emergency numbers are possible. For example, local police and file departments may have an emergency number for local use that is not 911. Such an emergency number may function in a similar manner to 911.

In many emergencies, a person may be able to dial 911 but may be unable to verbally communicate with the dispatcher. There may be many reasons for not being able to verbally communicate, such as a medical emergency or a criminal situation. The lack of verbal information may make the dispatchers job harder since the nature of the emergency may be unknown. The dispatcher may have to depend on background noise through the portable electronic device to assess the emergency. The dispatcher may have to dispatch a combination of emergency personnel to cover all possible contingencies, if the nature of the emergency is not clear. This may waste time and resources.

The 911 dispatcher may know where the caller is located based upon caller Auto Number Identification (ANI) and/or GPS location data. When a 911 call is placed, the phone number is identified through ANI. The name and physical address for a phone number may also be know through Automatic Location Identification (ALI). The 911 call may be routed through the use of a Master Street Address Guide (MSAG). The MSAG routes the call to the proper Public Safety Answering Point (PSAP). This means that when the 911 call is answered, it has been routed to the correct 911 dispatcher for the area and the ANI and ALI will be displayed. The routing of 911 call from a portable electronic device, such as a mobile phone, may be more complex.

Many portable electronic devices are Global Positioning System (GPS) capable. GPS is a satellite based system which sends signal allowing a device to define its approximate position on the earth. That is, the portable electronic device can receive satellite positioning data and display the location on the earth of the portable electronic device. Further, which such GPS capability, the portable electronic device may be able to transmit the GPS location data in conjunction with a 911 call. A dispatcher may then know the approximate location of the 911 caller using the portable electronic device. Not all 911 call centers may have this capability. In some cases, the position of the portable electronic device may be computed using cellular relay towers to triangulate the position of the device. Again, not all 911 call centers may have this capability

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

Figure 1:
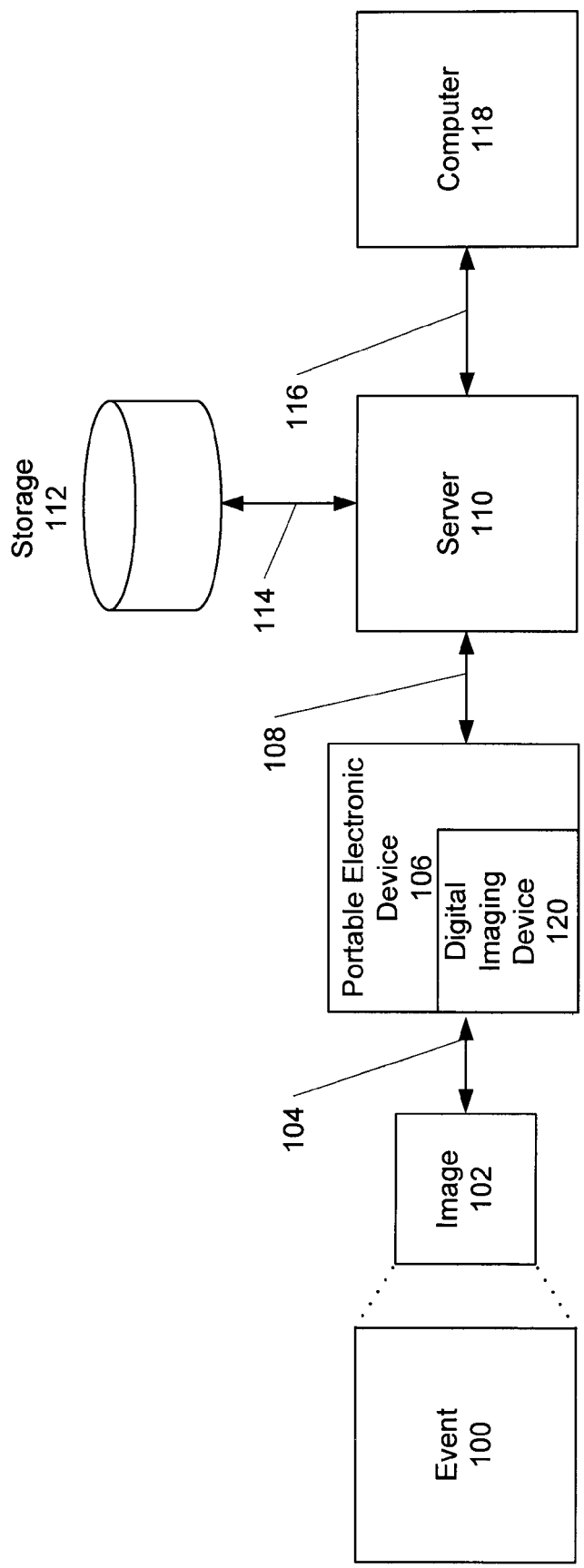
FIG. 1 depicts a block diagram of a system architecture for recording and transmitting emergency data in accordance with an exemplary embodiment.

These and other embodiments and advantages will become apparent from the following detailed description, taken in conjunction with the accompanying drawings, illustrating by way of example the principles of the various exemplary embodiments.

DETAILED DESCRIPTION OF PREFERRED EMBODIMENTS

Exemplary embodiments may provide a system and method for recording and transmitting emergency data during an emergency call. The emergency call may be placed by a person dialing the digits 9-1-1. The emergency data may be in the form of image data. A portable electronic device may be used to place the emergency call and to receive the image data. The image data may be received using a digital imaging device, such as a digital camera. The portable electronic device may perform processing, transmission, display, and storage of the image data. The image data may be transmitted from the portable electronic device to a server where the image data may be stored. Subsequently, the image data may be provided to an emergency dispatcher. The emergency dispatcher may access and view the image data from the server.

As used herein, the term "image data" refers to a digital image, multiple digital images, and digital video (streaming and non-streaming). It is understood that the image data may be in any suitable file format, such as a .jpg image or a .mov file.

The description below describes servers, portable electronic devices, and other computing devices that may include one or more modules, some of which are explicitly depicted in the figures, others are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices (e.g., servers) instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, portable electronic devices, client devices, computers, etc.) separately. The functions described as being performed at various components may be performed at other components, and the various components may be combined and/or separated. Other modifications also may be made.

The system implementing the method in accordance with exemplary embodiments may have components or modules associated with the portable electronic device to complete the steps of the method detailed below, such as receiving and transmitting of the image data. The portable electronic device may also have communications capability to be communicatively coupled over a suitable path with a server to transmit the data. The portable electronic device may contain one or more processors. The one or more processors may be dedicated to the processing of the image data or the one or more processors may be shared with other modules contained in the portable electronic device.

The modules on the portable electronic device may include a data input module, an activation module, a GPS module, a display module, a storage module, a transmit/receive module, a user interface module, and an erasing module. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Referring to FIG. 1, a block diagram of a system architecture for receiving and transmitting emergency data is shown in accordance with an exemplary embodiment. The system may include, among other things, an event 100, an image 102, a portable electronic device 106 with a digital imaging device 120, a server 110, storage 112, and a computer 118. Communications paths 104, 108, 114, and 116 may provide connectivity between the image 102 of the event 100 and the portable electronic device 106 and the server 110, the server 110 and storage 112, and the server 110 and the computer 118, respectively. Other various network components and embodiments may also be provided.

The event 100 may be any type of event that may necessitate an emergency call, such as a 911 call. Examples of such events may include, but not be limited to, a car accident, a fire, a burglary, and a bomb threat.

The portable electronic device 106 may be any portable electronic device with a digital imaging device 120 which is capable of taking a digital image in accordance with an exemplary embodiment. The portable electronic device 106 may consist of a cell phone or another mobile communication device, such as a personal digital assistant (PDA), e.g., a smart phone, or a Blackberry.

The portable electronic device 106 may be configured to receive data associated with the event 100. Such data may be in the form of an image 102 of the event 100. The image 102 may be a digital image. The image 102 may be received at the portable electronic device 106 through the digital imaging device 120. For example, the portable electronic device 106 may have an integrated digital imaging device 120, such as a digital camera.

The portable electronic device 106 may receive the image 102 over a communications path 104 through the digital imaging device 120. The communications path 104 may be any suitable path through which the portable electronic device 106 may receive the image 102. Typically, the communications path 104 may be through optical imaging, such as through a digital camera. For example, the portable electronic device 106 may receive the image 102 of the event 100 through a digital imaging device 120 which consists of a digital camera.

The data received through the digital imaging device 120 corresponding to the event 100 may be an image 102 in the form of a single digital image or a series of digital images. The image 102 is referred to in the singular tense, however it is understood that the image 102 may comprise a single image, more than one image, such as a series of images, and/or digital video (streaming and non-streaming). The series of digital images may be taken sequentially, with or without a delay between each image. In some embodiments, the digital imaging device 120 may be capable of taking a video of the event 100. Such a video may comprise streaming digital images, such as a digital movie of the event 100. In some embodiments, streaming video may not be received and transmitted if the transmission path, such as the communications path 108, has a low bandwidth that may not support streaming video. For example, if the communications path 108 has a low bandwidth due to many users or the path being an lower bandwidth network, then the streaming video function of the portable electronic device 106 may not be enabled. Such an override may be automatically initiated by the control features of the exemplary embodiment.

After the image 102 is received by the personal electronic device 106 through the digital imaging device 120, the portable electronic device 106 may process the image data which comprises the image 102. Such processing may include, but not be limited to, transforming the image 102 into a format suitable for transmission and storage. The portable electronic device 106 may compress the image for transmission. In some embodiments, no processing may occur of the image 102. The image 102 may be displayed by the portable electronic device 106 for review by the user of the portable electronic device. The image 102 may be cached in a temporary storage of the portable electronic device 106. The user may be prompted to store the image 102 following completion of the 911 call.

The portable electronic device 106, after placing a 911 call, may automatically initiate communications with a server 110. The communications with the server 110 may be over a data based network. Such a data based network may be the same or separate from the voice based network over which the 911 call was placed. The separation of networks for voice and data may allow the transmission of data while a person talks to the 911 dispatcher. It should be appreciated that the voice and data networks may be combined in some cases wherein data and voice share the same network. The communications between the portable electronic device 106 and the server 110 may be over a communications path 108. The portable electronic device 106 may also initiate contact with the server 110 through a manual command from the user of the portable electronic device 106. Such a command may be entered or selected on the portable electronic device 106. Upon successful initiation of communications between the portable electronic device 106 and the server 110, the portable electronic device 106 may be communicatively coupled with the server 110 over the communications path 108. Data, in the form of image data, may be exchanged between the portable electronic device 106 and the server 110. Data may be transmitted from the portable electronic device 106 to the server 110. Data may be transmitted from the server 110 to the portable electronic device 106. The data transmitted from the portable electronic device 106 to the server 110 may be compressed in format thereby requiring less bandwidth.

The data transmission from the portable electronic device 106 to the server 110 may be interrupted or ceased under certain conditions. For example, a low battery condition on the portable electronic device may cause the transmission to stop. The user may be given a warning of the condition. The warning may be audible or visual or a combination of both. An option may be presented to continue the transmission, that is, to override the condition that caused the transmission to cease.

The data transmission over communications path 108 may typically be in the form of digital image data, such as data corresponding to the image 102. The image 102 may also be in the form of a streaming digital video. The server 110 may perform processing of the data received from the portable electronic device 106, such as adding a file name to each image received from the portable electronic device 106. The server 110 may assign a filename that associates the data with the particular portable electronic device 106 that transmitted the data. The filename may be in the form of the ten digit phone number of the portable electronic device 106. By adding a filename comprising a unique identifier, the images may be retrieved at a later time using this identifier. A number may be appended to the filename indicating the number of the image. For example, the tenth image may have the number 10 appended to the phone number filename to designate it as the tenth image received. The filename may appear as 123_456_7890_10. Other such filenames may be used. The server 110 may add additional data to the image files, such as the date and time the image was received by the server. The association of the data with the portable electronic device 106 may allow for access and retrieval of the image data. The image data received may be processed or converted into another format suitable for storage on storage 112. The image data may be uncompressed in format, if it was compressed for transmission purposes.

The communications path 108 may be any suitable communications path, such as a wireless signal. The wireless signal may consist of Bluetooth, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and/or systems suitable for transmitting and receiving data from the portable electronic device 106 to the server 110. The portable electronic device 106 and the server 110 may use standard wireless protocols including IEEE 802.11a, 802.11b, 802.11g, and 802.11n.

The server 110 may send an acknowledgement to the portable electronic device 106 over the communications path 108 upon completion of the data transmission. The receipt may indicate if the transmission was successful. The receipt may be displayed upon the portable electronic device 106 for the user to review. The receipt may also consist of an audible tone or message, such as a text message or an electronic mail message which documents the transmission of the image 100. In some embodiments, no transmission of data may occur from the server 110 to the portable electronic device 106.

The server 110 may store the image data in the form of an image file in storage 112. The image files may be stored with the included associated data added by the server 110 during processing. The images may be stored according to filename in a manner which allows retrieval of the images.

The storage 112 may consist of any suitable storage device for the data from server 110. Storage 112 may consist of one of more data storage devices. Storage 112 may be local, remote, or a combination thereof with respect to the server 110. Storage 112 may utilize a redundant array of disks (RAID), striped disks, hot spare disks, tape, disk, or other computer accessible storage. In one or more embodiments, storage 112 may be a storage area network (SAN), an Internet small computer systems interface (iSCSI) SAN, a Fibre Channel SAN, a common Internet File System (CIFS), network attached storage (NAS), or a network file system (NFS). The storage 112 may have back-up capability built-in. The back-up capability of the storage 112 may be used to archive image data for later use. The back-up capability may be used for recovery of data in the event of a failure of the storage 112. Communications between storage 112 and the server 110 may over a communications path 114.

Communications path 114 may a network, such as a local area network or communications may be over a direct connection to server 110. Data may be transmitted and/or received from the server 110. Data transmission and receipt may utilize cabled network or telecom connections such as an Ethernet RJ45/Category 5 Ethernet connection, a fiber connection, a traditional phone wireline connection, a cable connection or other wired network connection. A wireless network may be used for the transmission and receipt of data. It is understood that a combination of networks may used, such as a combination of wired and wireless networks.

The server 110 and the storage 112 may be secured to prevent unauthorized access to the data stored therein. Such security may be required since 911 images may be maintained for a certain period of time. Further, images taken during an emergency, such as the event 100, may be sensitive in nature. For example, the image 102 may show the death of a person or a violent act being committed. Security may be provided in many forms, such as through a firewall or by encryption. It is understood that many such security features are possible and may be incorporated into embodiments of the system and method presented herein.

A computer 118 may communicate with the server 110. The communication may be over a communications path 116. The user of the computer 118 may initiate contact with the server 110 to retrieve the images associated with the portable electronic device 106. Upon establishment of communications with the server 110, data, in the form of digital images may be transmitted from the server 110 to the computer 118 for display to the user of the computer. Communications path 118 may be any suitable communications path, such as the Internet or other network. The server 110 may have an Internet based address that may allow the computer 118 to access it through the Internet, such as through a website or file transfer protocol. Typically, the server 110 not be co-located with the computer 118. In some embodiments, the server 110 and storage 112 may be located at and operated by a third party, such as a wireless network provider or a contractor.

The computer 118 may be an emergency dispatcher terminal in an exemplary embodiment. That is, the computer 118 is associated with an emergency dispatcher and may be co-located with said emergency dispatcher. The operator of the computer may be a 911 operator. Such an operator may receive 911 calls. The computer 118 may have Internet connection or other network based connectivity to facilitate access to the server 110. In other embodiments, the computer 118 may be a terminal operated by law enforcement or emergency personnel. For example, a police department may use a computer, such as the computer 118 and access the server 110 to view the image data associated with an emergency event, such as emergency event 100.

Upon establishment of communications with the server 110, through the communications path 116, the computer 118 may be presented with a listing of the data present in the storage 112. The user of the computer 118 may then have to locate the particular data they are interested in. The ten digit phone number of the portable electronic device 106 may be used to locate the data. This identification may allow the data from the portable electronic device 106 that is stored in storage 112 to be retrieved and transmitted to the user. In alternate embodiments, other location systems may be used.

Figure 2:
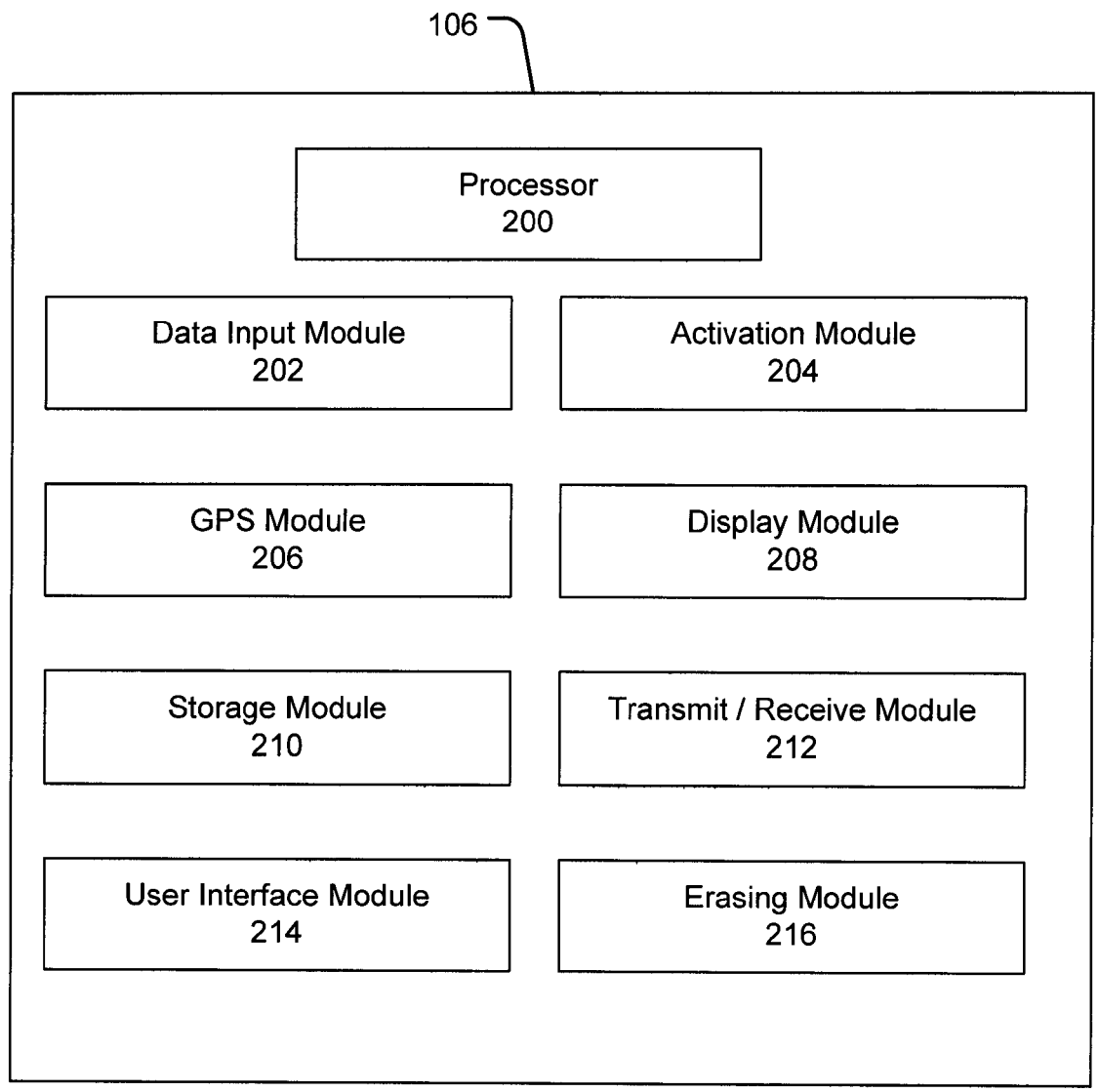
FIG. 2 depicts a block diagram of a system architecture for a personal electronic device in accordance with an exemplary embodiment.

FIG. 2 depicts a block diagram of an architecture of a portable electronic device 106 in accordance with an exemplary embodiment. This exemplary embodiment is provided by way of example, as there are a variety of architectures to implement the systems and methods described herein.

A processor 200 may be provided. The processor 200 may be used for processing the image data. Other functions may be performed by the processor as required. One or more processors may be provided. The processor 200 is shown as a separate module in FIG. 2, however in some embodiments, the processor 200 may be a distributed processor. The processor may be distributed among the various modules shown in FIG. 2. In other embodiments, the processor 200 may be shared with other functionality within the portable electronic device.

A data input module 202 may be provided. The data input module 202 may allow for the receipt of the image data. In other words, the data input module 202 may be the point through which the image data is received at the portable electronic device 106. In an exemplary embodiment, the data input module 202 may consist of an digital imaging device 120, e.g., a digital camera. In some embodiments, the data input module 202 may be communicatively coupled to the digital imaging device such that the data input module 202 controls the digital imaging device. The output from the digital imaging device 120 during a 911 call may be sent to the data input module 202.

An activation module 204 may be provided. The activation module 204 may activate the data input module 202 through a control signal. Such a control signal may be transmitted upon the successful connection of a 911 call. The activation module 204 may be part of the firmware or software of the portable electronic device 106. The activation module 204 may be installed during the manufacture of the portable electronic device 106. Alternatively, the activation module 204 may be installed or upgraded later on. The function of the activation module 204 may be fully automatic; that is, no intervention or input from the user of the portable electronic device 106 is required for the activation module 204 to activate the data input module 202. The activation module 204 may maintain the data input module 202 in an active state, that is taking images, such as image 102, of the event 100, for the duration of the 911 call. In alternative embodiments, the activation module may only activate the data input module 204 for a set amount of time or to take a pre-determined number of images during the 911 call. It should be appreciated that a manual override feature may be provided to allow the user to disable the functionality of the activation module 204. For example, the user of the portable electronic device 106 may be presented an option to disable the activation module 204, that is, during a 911 call, the activation module 204 will not activate the data input module 202 to receive image data. Such an option may be presented to the user as a global setting on the portable electronic device 106 for all emergency calls. In some embodiments, the option may be presented during the emergency call.

The activation module 204 may also stop the transmission due to certain conditions. The conditions may include such things as a low battery on the portable electronic device 106 or a weak data signal over the communications path 108. The activation module 204 may instruct the data input module 202 to stop taking images. The activation module may stop the transmit/receive module 212 from transmitting image data. An alert to the user may be displayed, alerting the user to the condition. A visual and/or audio alert may be provided. The user may be given the option to override the condition and continue taking images and transmitting data. The user may accept the condition and cease taking images and transmitting images. In some embodiments, the user may not be notified of the condition. That is, an alert may not be displayed to the user. The portable electronic device 106 may stop taking images based on a signal from the activation module 204 without intervention from the user.

The activation module 204 may activate the data input module 202 to receive streaming video, if the digital camera has the capability. The activation module 204 may automatically override this selection if the data network, such the communications path 108, does not have sufficient bandwidth to support the transmission of streaming video. The digital camera will revert to taking digital images instead of streaming video.

A GPS module 206 may be provided. The GPS module 206 may receive and process GPS data. The GPS data may be used to determine the approximate location of the portable electronic device 106. The GPS data may be transmitted from the portable electronic device to the 911 dispatcher during a 911 call. The GPS data may be displayed upon the portable electronic device 106.

A display module 208 may be provided. The display module 208 may display data on the portable electronic device 106. Such display of data may allow the user to review data. The portable electronic device's built-in display capabilities may be used. For example, the image 102 may be displayed on a liquid crystal display (LCD) of the portable electronic device 106. The image 102 may be displayed as it is received by the data input module 202; that is, the image is displayed as it is taken by the digital imaging device. Each image 102 that is received by the data input module 202 may be displayed. In some embodiments, the image 102 may not be displayed. The image 102 may be queued for later display.

A storage module 210 may be provided. The storage module 210 may provide for storage of the image data, such as image 102. The storage module 210 may consist of any suitable storage hardware or firmware or a combination thereof. In some embodiments, the storage module 210 may be removable from the portable electronic device 106, such as a removable memory card. The data input module 202 may forward the image 102 to the storage module 210 automatically following receipt in the data input module 202. In some embodiments, the image 102 may be stored in a temporary cache, such as random access memory (RAM), following receipt. The user may be prompted following the 911 call to save the image 102. If the user selects to not save the image 102, the image 102 may be erased from the temporary cache.

A transmit/receive module 212 may be provided. The transmit/receive module 212 may transmit the image data from the portable electronic device 106 to the server 110. The transmit/receive module 212 may receive information from the server 110. The transmit/receive module 212 may have transmit and receive capabilities separate from other transmit/receive modules or functions of the portable electronic device 106. That is, the transmit/receive module 212 may be dedicated for use during 911 calls. The transmit/receive module 212 may also receive data from the server 110, such as the acknowledgment of receipt of the image data. Alternatively, the transmit and receive functions may be distributed, as appropriate, to the other modules described in FIG. 2.

A user interface module 214 may provide a means for the user to interact with the portable electronic device 106 and the other modules described in FIG. 2. The user interface module 214 may provide for a suitable interface for the user, such as a graphical user interface (GUI). The capabilities of user interface module 214 may be limited by the capabilities of the personal electronic device 106. User input to the portable electronic device 106 through the user interface module 214 may be completed through such input devices as a keyboard, a touch screen, a trackwheel, or any other input means for entering or inputting information to the portable electronic device 106.

An erasing module 216 may be provided. The erasing module 216 may provide overwrite capability for information previously stored within the portable electronic device 106, such as image 102. The erasing module 216 may interface with the storage module 210. The erasing module 216 may erase previously stored data associated with a prior 911 call, i.e., image data associated with the event 100. The erasing module may erase the prior image data upon receipt of new image data in portable electronic device 106. The erasing module 216 may prompt the user regarding erasing the image data following the 911 call. The erasing module 216 may also have an option allowing the user to manually erase image data stored with the portable electronic device 106. Safety features may also be included in erasing module 216 to prevent accidental erasure of image data. The safety feature may include one or more warnings to the user about erasing data. The warnings may be audio or visual in nature. An override of such safety features may be provided.

Figure 3:
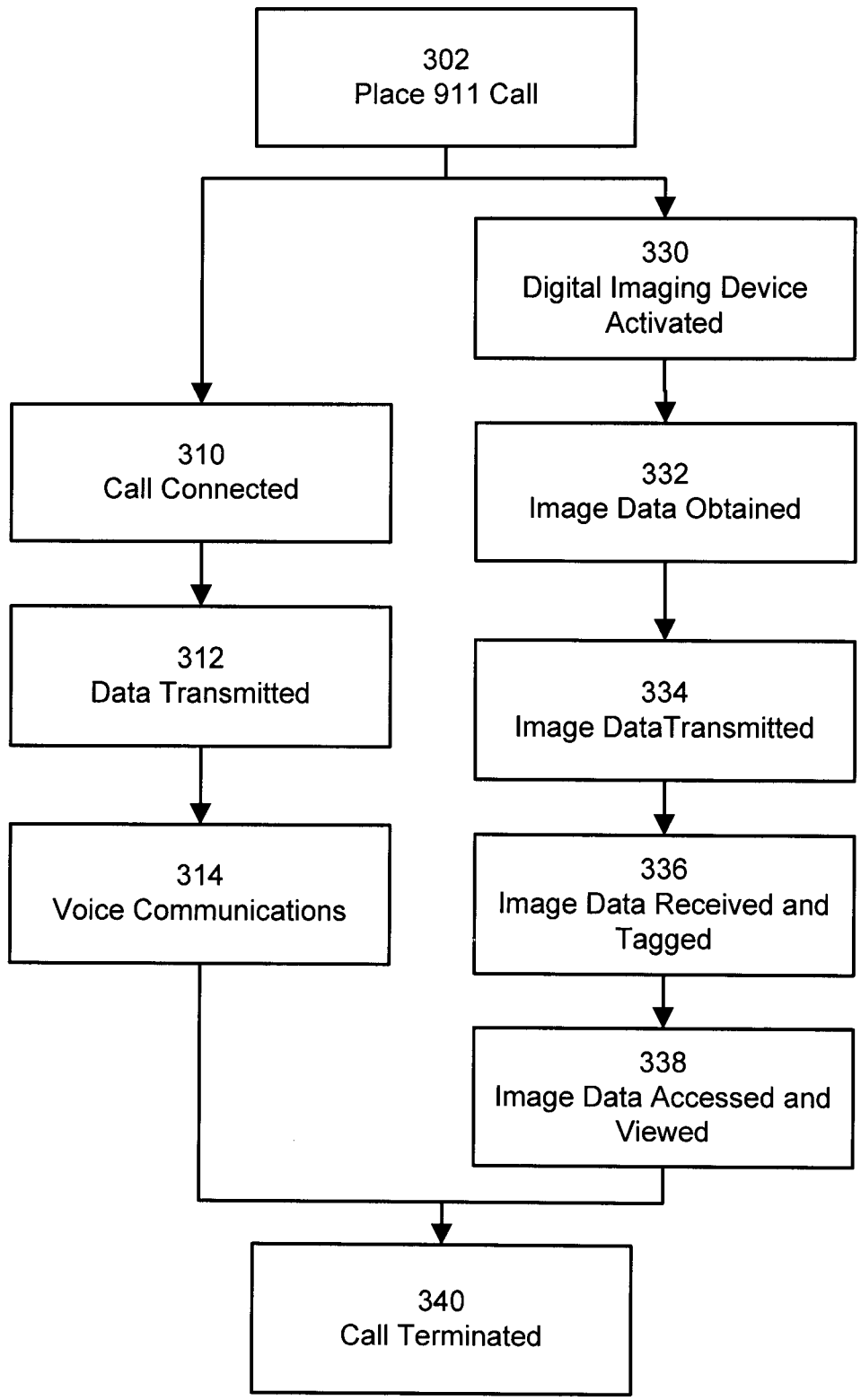
FIG. 3 depicts a flow chart of a method for recording and transmitting emergency data in accordance with an exemplary embodiment.

FIG. 3 depicts a flow chart of a method for recording and transmitting emergency data in accordance with an exemplary embodiment. Exemplary method 300 is provided by way of example, as there are a variety of ways to carry out the methods disclosed herein. The method 300 as shown in FIG. 3 may be executed or otherwise performed by one or a combination of various systems. The method 300 is described below as carried out on an exemplary system as shown in FIGS. 1 and 2 by way of example, and various elements of FIGS. 1 and 2 are referenced in explaining the exemplary method of FIG. 3. Each block shown in FIG. 3 represents one or more processes, methods, or subroutines carried out in the exemplary method 300. Referring to FIG. 3, the exemplary method 300 may begin at block 302.

At block 302, a 911 call is placed. A portable electronic device 106 may be used to place the call. For example, a person with a cell phone dials 911. The 911 call may be placed for various reasons. Typically, the 911 call is placed because emergency assistance of some form is required in response to an event, such as the event 100. For example, the person may need emergency medical assistance.

Continuing, at block 310, the call is connected. The 911 call may be routed through the appropriate phone system routing and be connected to an emergency dispatch center. It is understood that the emergency dispatch center may be known by different names in different jurisdictions. It is also understood that the emergency dispatcher may be known by other names, such as a 911 operator or dispatcher. For example, an emergency dispatcher answers the 911 call at the closest emergency dispatch center.

At block 312, data is transmitted. The data may consist of the ANI/ALI and any other call identifying information that is part of an emergency call. This data may be automatically obtained from the phone number of the portable electronic device 106 from various databases maintained by the phone service provider. This data may be transmitted to the emergency dispatch center as part of the 911 call. The GPS data associated with the portable electronic device 106 may be transmitted, if the portable electronic device possesses GPS capability. The GPS module 206 of the portable electronic device 106 may provide the GPS data to be transmitted through the transmit/receive module 212. For example, the emergency dispatcher, upon answering the call, such as at block 310, may have the call information displayed on their computer terminal, such as the computer 118. In an alternative embodiment, the location information for the portable electronic device 106 may be obtained through triangulation using cellular relay towers. This capability may be in addition to or in place of GPS location data. It is should be appreciated that not all emergency dispatch centers may have this capability. It is understood that this step may be performed at about the same time with block 310 above.

At block 314, voice communications are established. The voice communications are established between the person placing the 911 call from the portable electronic device 106 and a 911 dispatcher in the emergency dispatch center. It is understood that this step may occur in at about the same time as block 312. The 911 dispatcher may ask a series of questions of the person placing the call once communications are established. The questions may be typically designed to gather the necessary information to determine the nature of the emergency. For example, the 911 dispatcher may ask the person the nature of the emergency. It is understood that in some situations, voice communications may not be possible or even desired. In that case, the 911 dispatcher may have to rely upon the image data, as described below. For example, the person calling 911 may be in a hostage situation and may not be able to talk, but have merely dialed 911 to alert the proper authorities of the situation. Other such situations are possible.

At block 330, the digital imaging device is activated. The activation of the digital imaging device may be performed by the activation module 204 in response to connection of the 911 call. For example, the person places a 911 call, the 911 call is connected, and the digital imaging device 120 associated with the portable electronic device 106 is activated by the activation module 204, such as, the digital camera on a cell phone is activated. It is understood that this step may be performed at about the same time as block 310.

Continuing at block 332, image data is obtained. That is, an image or images are taken. The image or images may be captured by the digital imaging device 120 associated with the portable electronic device 106. Such images may be automatically taken. For example, following activation of the digital camera, the digital camera takes an image or a series of images. The data input module 202 may receive the image or images. The digital camera may continue to take such images, that is the digital camera may continuously take images. The digital camera may take images with a predetermined delay between each image, such as 1 sec. Other such delays or sequencing are possible. The digital camera may take images for the duration of the 911 call. Once the image or images are taken, they may be stored on the portable electronic device 106 using the storage module 210. The images may be displayed on the portable electronic device 106 using the display module 208. Alternatively, the images may be stored in a temporary cache or in storage 210. The user may be prompted following the 911 call to review the images. The user may interface with the images through the user interface module 214. The user may erase the images using the erasing module 216. In some embodiments, the images may be in the form of streaming video, if the digital camera has this capability. The streaming video may not be used if the data transmission path has a low bandwidth. This may be an automatic decision that the activation module 204 may undertake.

At block 334, the image data is transmitted. The transmission may be to a server, such as the server 110. The transmission of the image data may be done through the transmit/receive module 212. The transmission of the image data may be automatic. The portable electronic device 106 may perform processing of the image data prior to transmission. For example, once the image is taken by the digital camera, it may be transmitted to the server 110. The transmission may be over a data network such that the transmission of the image or images occurs at the same time as the voice communications during the 911 call, such as in block 314. An image may be immediately transmitted once it is received. A series of images may be transmitted at a time, that is, the images may be transmitted after a certain number are taken, such as 3 or 4. The transmission of data may be compressed to take less band width on the data network. It is understood that a variety of transmission combinations are possible.

At block 336, the image data is received and tagged. The server 110 may receive the image data from the portable electronic device 106. Following receipt, the server 110 may process the image data. The server 110 may designate a filename for each image. The file name may comprise the ten digit phone number of the portable electronic device 106 followed by a sequential number to indicate the image number. Other such file naming conventions are possible. Additional data may also be tagged on the image, such as the data and time of the image. The image may be processed or converted into a suitable format for storage by the server 110. Following the tagging by the server 110, the image file may be stored in storage 112. The server 110 may transmit an acknowledgement for receipt of the image data to the portable electronic device 106. Such an acknowledgement may be sent for each image. Alternatively, the acknowledgment may be sent following the completion of the 911 call. The acknowledgement may be received on the portable electronic device 106 through the transmit/receive module 212 and displayed for the user to review using the display module 208.

At block 338, the image data is accessed and viewed. That is, the image data is retrieved from the server. The emergency dispatcher may receive a notification that the server 110 has received images from the portable electronic device 106. Such notification may consist of a link or other form of notification on the computer 118. The notification may be through a pop-up type message on the screen of the computer 118. The notification may be a combination of a message and a link. The link may consist of a Uniform Resource Locator (URL), such as an Internet address. Such notification provides the 911 dispatcher with notification that there is image data associated with the portable electronic device 106. The notification may be important if voice communications in block 314 are not able to be established. That is, the images may be the only way the 911 dispatcher may receive details regarding the emergency event. The emergency dispatcher may access the server 110 to retrieve the image data using the provided link. The emergency dispatcher may go to a designated website following receipt of the notification message. The emergency dispatcher may then search for the image data on the server 110, typically using the ten digit phone number of the portable electronic device 106. The image data may be located and then accessed. Following access to the image data, the images may be viewed by the emergency dispatcher. The image data may be viewed in any suitable manner using an appropriate program on the computer 118. It is understood that there are many ways to access and view image data on a computer, such as the computer 118. The access and viewing of the image data may occur during the 911 call, that is, the viewing may occur in almost real time. The notification may be transmitted once the server 110 has received an image from the portable electronic device 106. The emergency dispatcher, upon review of the image data, may direct the person to position the camera to take more images from a certain angle.

At block 340, the call is terminated. Upon completion of the 911 call, the call may be terminated. The 911 dispatcher may terminate the call once they have the information needed. The person may terminate the call. The call may be terminated for a variety of reasons, such as the person must leave the area due to personal danger from the event 100. For example, a person may have called 911 to report a fire. The fire may grow in size and approach the location of the person making the call. The person may terminate the call to flee the area. Upon termination of the call, the activation module 204, may deactivate the data input module 202. That is, the digital camera on the portable electronic device 106 may cease taking images.

In the preceding specification, various exemplary embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
    placing an emergency call from a portable electronic device;
    receiving image data, at the portable electronic device, wherein the image data is received in response to the placing of the emergency call and is received through a digital imaging device that is associated with the portable electronic device;
    transmitting the image data to a server from the portable electronic device, wherein the image data is associated with a filename comprising a phone number associated with the portable electronic device; and
    receiving an acknowledgement at the portable electronic device that the image data was received by the server, the acknowledgement being displayable upon the portable electronic device.

2. The method of claim 1, wherein placing the emergency call is in response to an emergency telephone number being entered into the portable electronic device.

3. The method of claim 1, where placing the emergency call further comprises connecting the portable electronic device to an emergency dispatcher via an operator.

4. The method of claim 1, wherein the portable electronic device is at least one of a mobile phone and a personal digital assistant.

5. The method of claim 1, wherein the digital imaging device is a digital camera.

6. The method of claim 1, wherein the image data comprises at least one of a digital image, a series of digital images, and digital video.

7. The method of claim 1, further comprising:
storing of the image data on the server;
retrieving the image data from the server; and
displaying the image data on a computer remote from the server.

8. An apparatus, comprising:
at least one processor;
an activation module, configured to activate the data input module in response to an emergency call being placed from the apparatus;
a data input module, configured to receive image data; and
a transmit and receive module, configured to cause the image data to be transmitted to a server and allow data to be received from a server,
wherein the server assigns a filename to the image data, the filename comprising a phone number associated with the portable electronic device, and
wherein the data to be received from the server comprises an acknowledgement that the image data was received by the server, the acknowledgement being displayable upon the apparatus.

9. The apparatus of claim 8, further comprising:
an erasing module configured to erase previously stored image data associated with a prior emergency call in response to receipt of the image data associated with the emergency call.

10. The apparatus of claim 8, further comprising:
a display module, configured to display the image data.

11. The apparatus of claim 10, further comprising:
a user interface module, configured to allow a user to interact with the apparatus.

12. The apparatus of claim 8, wherein the apparatus comprises at least one of a mobile phone and a personal digital assistant.

13. The apparatus of claim 8, wherein the data input module is a digital camera.

14. The apparatus of claim 8, wherein the apparatus is configured to place an emergency call.

15. The apparatus of claim 8, wherein the apparatus is configured to place an emergency call in response to an emergency telephone number being entered into the apparatus.

16. The apparatus of claim 8, wherein the image data comprises at least one of a digital image, a series of digital images, and digital video.

17. A system, comprising:
a portable electronic device configured to:
place an emergency call in response to an emergency telephone number being entered into the portable electronic device;
receive image data in response to the emergency call wherein the image data is in the form of a digital image and wherein the image data is received through a digital imaging device associated with the portable electronic device; and
transmit the image data;
a server communicatively coupled with the portable electronic device and is configured to:
receive the image data from the portable electronic device and store the image data;
assign a filename to the image data, the filename comprising a phone number associated with the portable electronic device that transmits the image data;
retrieve the image data in response to a request wherein the request is originated from a remote computer;
send the retrieved image data to the remote computer wherein the remote computer is configured to at least display the retrieved image data; and
send an acknowledgement to the portable electronic device to acknowledge that the image data was received by the server, the acknowledgement being displayable upon the portable electronic device; and
a storage device, communicatively coupled to the server, wherein the storage device stores the image data received by the server from the portable electronic device;
wherein the image data comprises at least one of a digital image, a series of digital images, and digital video.

18. The system of claim 17, wherein the emergency call further comprises connecting the portable electronic device to an emergency dispatcher via an operator.

19. The system of claim 17, wherein the portable electronic device comprises at least one of a mobile phone and a personal digital assistant.

20. The system of claim 17, wherein the digital imaging device comprises a digital camera.

21. The system of claim 17, wherein the server is further configured to send a notification to an emergency dispatcher indicating that image data associated with the portable electronic device has been received at the server.

22. The system of claim 21, wherein the notification is a link in the form of a uniform resource locator (URL) that allows the emergency dispatcher to retrieve the image data.

23. The method of claim 3, wherein the emergency dispatcher only receives image data from the portable electronic device because voice communications are not able to be established directly with the portable electronic device.

24. An apparatus, comprising:
at least one processor;
an activation module, configured to activate the data input module in response to an emergency call being placed from the apparatus;
a data input module, configured to receive image data; and
a transmit and receive module, configured to cause the image data to be transmitted to a server and allow data to be received from a server,
wherein the server assigns a filename to the image data, the filename comprising:
a phone number associated with the portable electronic device, and
a numeral indicating a number of the image data received by the server and indicative of a number of separate transmissions,
wherein the data to be received from the server comprises an acknowledgement that the image data was received by the server, the acknowledgement being displayable upon the apparatus.

25. The apparatus of claim 24, wherein the server assigns a date and time to the image data indicating when the server received the image data.

26. The apparatus of claim 17, wherein the server assigns a date and time to the image data indicating when the server received the image data.

27. The apparatus of claim 24, wherein the acknowledgement displayable upon the apparatus comprises a text message or an electronic mail message.

\* \* \* \* \*